US008309633B2

(12) United States Patent
Burns

(10) Patent No.: US 8,309,633 B2
(45) Date of Patent: Nov. 13, 2012

(54) LOW TEMPERATURE, CATIONICALLY CURABLE COMPOSITIONS WITH IMPROVED CURE SPEED AND TOUGHNESS

(75) Inventor: Barry N. Burns, Killiney (IE)

(73) Assignee: Henkel Ireland Ltd., Dublin (IE)

( * ) Notice: Subject to any disclaimer, the term of this patent is extended or adjusted under 35 U.S.C. 154(b) by 297 days.

(21) Appl. No.: 12/504,693

(22) Filed: Jul. 17, 2009

(65) Prior Publication Data

US 2010/0016494 A1 Jan. 21, 2010

Related U.S. Application Data

(60) Provisional application No. 61/081,436, filed on Jul. 17, 2008.

(51) Int. Cl.
*C08L 63/00* (2006.01)
*C09J 163/00* (2006.01)

(52) U.S. Cl. ............................ 523/440; 522/83; 522/129

(58) Field of Classification Search .................. 524/493, 524/500, 700; 525/107, 122; 977/773; 523/440; 522/83, 170, 129
See application file for complete search history.

(56) References Cited

U.S. PATENT DOCUMENTS

| | | | | |
|---|---|---|---|---|
| 4,308,118 A * | 12/1981 | Dudgeon | ........................ | 428/63 |
| 4,419,496 A | 12/1983 | Henton et al. | ................... | 525/301 |
| 4,778,851 A | 10/1988 | Henton et al. | ................... | 525/65 |
| 4,916,805 A | 4/1990 | Ellrich et al. | ..................... | 29/832 |
| 5,382,635 A | 1/1995 | McInnis et al. | ................ | 525/356 |
| 5,506,283 A | 4/1996 | McInnis et al. | ............. | 515/332.8 |
| 5,550,265 A | 8/1996 | Castellanos et al. | ................ | 556/7 |
| 5,668,192 A | 9/1997 | Castellanos et al. | ............. | 552/31 |
| 5,693,714 A | 12/1997 | Bauman et al. | ................ | 525/104 |
| 5,721,289 A | 2/1998 | Karim et al. | ..................... | 522/31 |
| 5,721,451 A | 2/1998 | Settles et al. | .................. | 257/679 |
| 5,777,903 A | 7/1998 | Piosenka et al. | .............. | 364/700 |
| 5,863,970 A | 1/1999 | Ghoshal et al. | ............... | 523/434 |
| 5,969,053 A | 10/1999 | Bauman et al. | ............. | 525/331.5 |
| 5,981,659 A | 11/1999 | Geck et al. | ..................... | 525/100 |
| 6,111,015 A | 8/2000 | Eldin et al. | ....................... | 525/65 |
| 6,129,955 A | 10/2000 | Papathomas et al. | ......... | 427/517 |
| 6,147,142 A | 11/2000 | Geck et al. | ..................... | 523/201 |
| 6,147,184 A | 11/2000 | Castellanos et al. | .......... | 528/410 |
| 6,153,661 A | 11/2000 | Castellanos et al. | ............ | 522/31 |
| 6,180,693 B1 | 1/2001 | Tang et al. | ..................... | 523/201 |
| 6,429,281 B1 | 8/2002 | Dershem et al. | .............. | 528/412 |
| 6,918,984 B2 * | 7/2005 | Murray et al. | ............. | 156/275.5 |
| 7,423,073 B2 * | 9/2008 | Mrvos et al. | .................. | 522/170 |
| 7,625,977 B2 * | 12/2009 | Lutz et al. | ........................ | 525/65 |
| 7,750,094 B2 * | 7/2010 | Burns et al. | ................... | 525/476 |
| 7,759,435 B2 * | 7/2010 | Burns et al. | ................... | 525/476 |
| 7,919,555 B2 * | 4/2011 | Agarwal et al. | ............... | 524/500 |
| 8,088,245 B2 * | 1/2012 | Lutz et al. | ..................... | 156/325 |
| 2007/0213429 A1 * | 9/2007 | Cheng et al. | .................. | 523/458 |
| 2007/0267134 A1 * | 11/2007 | Konarski et al. | ........... | 156/273.3 |
| 2009/0294056 A1 * | 12/2009 | Yoshimura et al. | ........... | 156/327 |
| 2010/0234516 A1 * | 9/2010 | Burns et al. | ................... | 524/500 |
| 2011/0097212 A1 * | 4/2011 | Thompson et al. | ........... | 416/230 |

FOREIGN PATENT DOCUMENTS

| | | | | |
|---|---|---|---|---|
| WO | PCT/FR98/00566 | 10/1998 | ......................... | 7/75 |
| WO | PCT/FR98/00741 | 10/1998 | ......................... | 2/50 |
| WO | WO04/000965 | 12/2003 | | |

OTHER PUBLICATIONS

Kerr, S.R., III, "Next Generation UV Silicone Release Coatings", Adh. Age, p. 26-34 Aug. 1996.
Möst, R., "Light-Curing Adhesives for Electronics", *Delo*, p. 1-7 (Undated).
Lathrop, R.R., Jr., "A Flexible Method for Applying Adhesives to Printed Circuit Boards", Adh. Age, p. 22-33, Dec. 1998.

* cited by examiner

*Primary Examiner* — Susan W Berman
(74) *Attorney, Agent, or Firm* — Steven C. Bauman

(57) ABSTRACT

The present invention relates to low temperature, cationically curable compositions with improved cure speed and toughness.

14 Claims, No Drawings

LOW TEMPERATURE, CATIONICALLY CURABLE COMPOSITIONS WITH IMPROVED CURE SPEED AND TOUGHNESS

BACKGROUND OF THE INVENTION

1. Field of the Invention

The present invention relates to low temperature, cationically curable compositions with improved cure speed and toughness.

2. Brief Description of Related Technology

Toughness generally is the ability of a material to absorb energy and undergo large permanent set without rupture. For many engineering adhesive applications, toughness is often the deciding factor. Plastics, because of their inherent brittleness, have heretofore been modified in a variety of ways in efforts to improve the toughness thereof. Epoxy resins, for example, which form a versatile glassy network when cured, exhibit excellent resistance to corrosion and solvents, good adhesion, reasonably high glass transition temperatures ("$T_g$") and adequate electrical properties. Unfortunately, however, the poor fracture toughness of epoxy resins oftentimes limits the usefulness thereof in many commercial applications.

The impact strength, as well as other physical properties of crosslinked epoxy resins, is controlled by the chemical structure and molecular weight of the epoxy resin, weight ratio of the epoxy resin to the hardener, by any added fillers, and by the conditions used to cure the formulation. Unfortunately, crosslinked, glassy epoxy resins with a relatively high $T_g$ (>100° C.) are brittle in nature. For instance, a conventional cycloaliphatic epoxy, CYRACURE 6110, cures to a very brittle polymer which shows virtually no T-peel strength. The poor impact strength of high glass transition epoxy resins limits their usage as structural materials and use in or as composites.

Heretofore, cationically curable epoxy compositions have been difficult to toughen due to the high crosslink density and the inherent brittleness of the cured polymer. In addition many conventional toughening agents, such as the CTBN rubbers, contain basic functionality that can retard or negate the cationic cure mechanism.

It would be desirable for epoxy compositions to be toughened on the one hand and remain curable—rapidly and at low temperature—on the other.

SUMMARY OF THE INVENTION

The present invention relates broadly to low temperature, cationically curable compositions with improved cure speed and toughness.

More specifically, the present invention provides a cationically curable composition, components of which include:
 a. a cycloaliphatic epoxy;
 b. a hydroxyl-functionalized aliphatic polyester;
 c. a rubber component having a particle size on the order of $10^{-9}$ meters;
 d. a silica component having a particle size on the order of $10^{-9}$ meters; and
 e. a cationic cure catalyst.

The composition can be cured by exposure to a temperature of above about 80° C. to below about 150° C. for a period of time of about 30 minutes to about 2 hours, desirably for instance a temperature of 100° C. for a period of time of 30-60 minutes. After this time period within this temperature range greater than at least 90 percent cure can be attained.

Once cured, the compositions exhibit high tensile peel strength and good fracture toughness, and also shows and provide good adhesion to a range of plastic substrates.

When cationic cure catalysts are used in a formulation of a cycloaliphatic epoxy; a hydroxyl-functionalized aliphatic polyester; a rubber component having a particle size on the order of $10^{-9}$ meters and a silica component having a particle size on the order of $10^{-9}$ meters, rapid curing at low temperature may be observed. In addition, so-cured compositions exhibit T-peel strengths in the range of 10-17 N/mm and high fracture toughness as measured by tapered double cantilever beam with G1c values in the range of 1400-1700 Jm$^{-2}$.

DETAILED DESCRIPTION OF THE INVENTION

As noted above, the present invention provides a cationically curable composition comprising:
 a. a cycloaliphatic epoxy;
 b. a hydroxyl-functionalized aliphatic polyester;
 c. a rubber component having a particle size on the order of $10^{-9}$ meters, an example of which is KANEKA MX 550 and 551;
 d. a silica component having a particle size on the order of $10^{-9}$ meters, an example of which is NANOPOX A610; and
 e. a cationic cure catalyst, an example of which is NACURE XC-7231, an ammonium antimony hexafluoride catalyst.

Cycloaliphatic epoxy resins contain at least one cycloaliphatic group and at least one oxirane group, oftentimes two oxirane groups. Representative cycloaliphatic epoxy resins include 2-(3,4-epoxy)cyclohexyl-5,5-spiro-(3,4-epoxy)cyclohexane-m-dioxane, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, vinyl cyclohexanedioxide, bis(3,4-epoxycyclohexylmethyl)adipate, bis(3,4-epoxy-6-methylcyclohexylmethyl)adipate, exo-exo bis(2,3-epoxycyclopentyl) ether, endo-exo bis(2,3-epoxycyclopentyl)ether, 2,2-bis(4-(2,3-epoxypropoxy)cyclohexyl)propane, 2,6-bis (2,3-epoxypropoxycyclohexyl-p-dioxane), 2,6-bis(2,3-epoxypropoxy)norbornene, the diglycidylether of linoleic acid dimer, limonene dioxide, 2,2-bis(3,4-epoxycyclohexyl)propane, dicyclopentadiene dioxide, 1,2-epoxy-6-(2,3-epoxypropoxy)hexahydro-4,7-methanoindane, p-(2,3-epoxy) cyclopentylphenyl-2,3-epoxypropylether, 1-(2,3-epoxypropoxy)phenyl-5,6-epoxyhexahydro-4,7-methanoindane, o-(2,3epoxy)cyclopentylphenyl-2,3-epoxypropyl ether), 1,2-bis[5-(1,2-epoxy)-4,7-hexahydromethanoindanoxyl]ethane, cyclopentenylphenyl glycidyl ether, cyclohexanediol diglycidyl ether, and diglycidyl hexahydrophthaiate. In particular embodiments cycloaliphatic epoxy resins are 3,4-epoxycyclohexylmethyl-3,4-epoxycyclohexanecarboxylate and 3,4-epox-6-methylcyclohexylmethyl-3,4-epoxy-6-methylcyclohexanecarboxylate. Other examples of cycloaliphatic epoxies suitable for use herein include those disclosed and described in U.S. Pat. No. 6,429,281 (Dershem), the disclosure of which being hereby expressly incorporated herein by reference.

The hydroxyl-functionalized aliphatic polyester provides improved flexibility to the cured composition. One commercially available example is K-FLEX A307, which is from King Industries. K-FLEX A307 is reported by the manufacturer to be a low viscosity, 100% solids linear, saturated, aliphatic polyester diol with primary hydroxyl groups. K-FLEX A307 is promoted to have been designed as a flexibility modifier for acrylic/isocyanates and acrylic/melamine systems. Commercial applications are advertised as automotive OEM, automotive refinish, aerospace, industrial maintenance, and plastic coatings. Other K-FLEX materials suitable for use include K-FLEX 188, K-FLEX XM-A308 and K-FLEX 148, each of which being described by the manufacturer as polyester polyols.

The rubber particles—in the case of core shell rubbers—have a core comprised of a polymeric material having elastomeric or rubbery properties (i.e., a glass transition temperature less than about 0° C., e.g., less than about −30° C.) surrounded by a shell comprised of a non-elastomeric polymeric material (i.e., a thermoplastic or thermoset/crosslinked polymer having a glass transition temperature greater than ambient temperatures, e.g., greater than about 50° C.). For example, the core may be comprised of a diene homopolymer or copolymer [for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like] while the shell may be comprised of a polymer or copolymer of one or more monomers such as (meth)acrylates (e.g., methyl methacrylate), vinyl aromatic monomers (e.g., styrene), vinyl cyanides (e.g., acrylonitrile), unsaturated acids and anhydrides (e.g., acrylic acid), (meth)acrylamides, and the like having a suitably high glass transition temperature. Other rubbery polymers may also be suitably be used for the core, including polybutylacrylate or polysiloxane elastomer (e.g., polydimethylsiloxane, particularly crosslinked polydimethylsiloxane).

The rubber particle may be comprised of more than two layers (e.g., a central core of one rubbery material may be surrounded by a second core of a different rubbery material or the rubbery core may be surrounded by two shells of different composition or the rubber particle may have the structure soft core, hard shell, soft shell, hard shell). Or, the rubber particles may be comprised of a core and at least two concentric shells having different chemical compositions and/or properties. Either the core or the shell or both the core and the shell may be crosslinked (e.g., tonically or covalently). The shell may be grafted onto the core. The polymer comprising the shell may bear one or more different types of functional groups (e.g., epoxy groups) that are capable of interacting with other components of the compositions of the present invention.

Typically, the core should comprise from about 50 to about 95 weight percent of the rubber particles while the shell will comprise from about 5 to about 50 weight percent of the rubber particles.

The rubber particles should have an average particle size on the order of $10^{-9}$ meters.

Methods of preparing rubber particles having a core-shell structure are well-known in the art and are described, for example, in U.S. Pat. Nos. 4,419,496, 4,778,851, 5,981,659, 6,111,015, 6,147,142 and 6,180,693, each of which being incorporated herein by reference in its entirety.

Rubber particles are dispersed in an epoxy resin matrix. Particularly suitable dispersions of rubber particles having a core-shell structure in an epoxy resin matrix that is cationically curable, such as a cycloaliphatic one, are available from Kaneka Corporation, such as KANEKA MX 550.

For instance, the core may be formed predominantly from feed stocks of polybutadiene, polyacrylate, polybutadiene/acrylonitrile mixture, polyols and/or polysiloxanes or any other monomers that give a low glass transition temperature. The outer shells may be formed predominantly from feed stocks of polymethylmethacrylate, polystyrene or polyvinyl chloride or any other monomers that give a higher glass transition temperature.

The core shell rubber dispersion may be present in the cationically curable epoxy matrix in an amount in the range of about 5 to about 50 percent by weight, with about 15 to about 25 percent by weight being desirable based on viscosity considerations.

Many of the core shell rubber structures available from Kaneka are believed to have a core made from a copolymer of (meth)acrylate-butadiene-styrene, where the butadiene is the primary component in the phase separated particles, dispersed in epoxy resins.

Other commercially available core shell rubber particles suitable for use herein include PARALOID EXL2600, EXL2314, EXL2691 from Wacker Chemie GmbH, and DUOMOD 5045 from Zeon Chemicals.

The rubber particles generally are comprised of a polymeric material having elastomeric or rubbery properties (i.e., a glass transition temperature less than about 0° C., e.g., less than about 30° C.). For example, the rubber particles may be comprised of a diene homopolymer or copolymer (for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like) and polysiloxanes. The rubber particles may contain functional groups such as carboxylate groups, hydroxyl groups or the like and may have a linear, branched, crosslinkedr random copolymer or block copolymer structure.

For instance, the rubber particles may be formed predominantly from feed stocks of dienes such as butadiene, (meth) acrylates, ethylenically unsaturated nitrites such as acrylonitrile, and/or any other monomers that when polymerized or copolymerized yield a polymer or copolymer having a low glass transition temperature.

Combinations of different rubber particles may advantageously be used in the present invention. The rubber particles may differ, for example, in particle size, the glass transition temperatures of their respective materials, whether, to what extent and by what the materials are functionalized, and whether and how their surfaces are treated.

In the case of those rubber particles that do not have a shell, the rubber particles may be based on the core of such structures.

The chemical composition of the rubber particles may be essentially uniform throughout each particle. However, the outer surface of the particle may be modified by reaction with a coupling agent, oxidizing agent or the like so as to enhance the ability to disperse the rubber particles in the adhesive composition (e.g., reduce agglomeration of the rubber particles, reduce the tendency of the rubber particles to settle out of the adhesive composition). Modification of the rubber particle surface may also enhance the adhesion of the epoxy resin matrix to the rubber particles when the adhesive is cured. The rubber particles may alternatively be irradiated so as to change the extent of crosslinking of the polymer(s) constituting the rubber particles in different regions of the particle. For example, the rubber particles may be treated with gamma irradiation such that the rubber has a gradient of crosslink density from the surface to the interior of the particle (more highly crosslinked near the surface of the particle than in the center of the particle).

Commercially available examples of such rubber particles include NEP R401S (based on acrylonitrile/butadiene copolymer), R501S, R601S and R701S (based on butadiene/styrene/2-vinylpyridine copolymer; CAS No. 25053-48-9) from Eliokem, Inc.

Rubber particles that have been treated with a reactive gas or other reagent to modify the outer surfaces of the particles by, for instance, creating polar groups (e.g., hydroxyl groups, carboxylic acid groups) on the particle surface, are also suitable for use in the present invention. Illustrative reactive gases include, for example, ozone, $Cl_2$, $F_2$, $O_2$, $SO_3$, and oxidative gases. Methods of surface modifying rubber particles using such reagents are known in the art and are described, for example, in U.S. Pat. Nos. 5,382,635; 5,506,283; 5,693,714; and 5,969,053, each of which is incorporated herein by reference in its entirety. Suitable surface modified rubber particles are also available from commercial sources, such as the rubbers sold under the tradename VISTAMER by Exousia Corporation. And surface modified polyethylene particles include INHANCE HD1800 from Fluoro-Seal. For purpose of this application, these materials are embraced by the term "rubber particles".

The silica component should have a mean particle diameter on the nanoparticle size; that is, having a mean particle diameter on the order of $10^{-9}$ meters. The silica nanoparticles can be pre-dispersed in epoxy resins, and may be selected from those available under the tradename NANOPOX, from Nanoresins, Germany. NANOPOX is a tradename for a product family of silica nanoparticle reinforced epoxy resins showing an outstanding combination of material properties. The silica phase consists of surface-modified, synthetic $SiO_2$ nanospheres with less than 50 nm diameter and an extremely narrow particle size distribution. The $SiO_2$ nanospheres are agglomerate-free dispersions in the epoxy resin matrix resulting in a low viscosity for resins containing up to 50 percent by weight silica.

A commercially available example of the NANOPOX products particularly desirable for use herein includes NANOPOX A610 (a 40 percent by weight dispersion in a cycloaliphatic epoxy resin matrix). The NANOPOX products are believed to have a particle size of about 5 nm to about SO nm, though the manufacturer reports less than 50 nm.

The silica component should be present in an amount in the range of about 0.5 to about 10 percent by weight, such as about 1 to about 8 percent by weight, desirably about 2.5 to about 7.5 percent by weight, based on the total weight of the composition. The addition of such a silica component increases the tensile shear strengths; however, the addition of too much decreases the T-peel strength. Thus, achieving the appropriate balance is important which is why the range set forth above is noteworthy.

The cationic cure catalyst may be selected from onium salts, iodonium salts and sulfonium salts, the salts of which being chosen from tetrakis(pentafluorophenyl)borate, hexafluorophosphate and hexafluoroantimonate, for instance. For instance, the cationic cure catalysts include those having a core cation within structure I below:

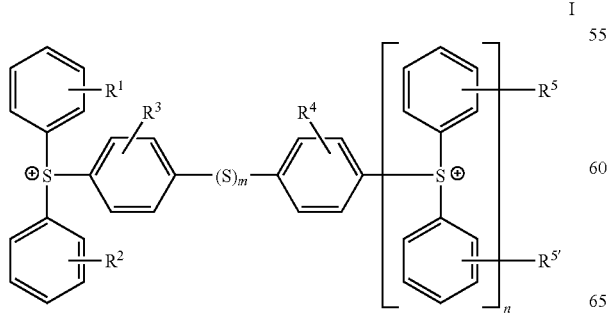

I where $R^1$, $R^2$, $R^3$, $R^4$, $R^5$ and $R^{5'}$ may or may not be present, but when not present are hydrogen and when any are present may individually be selected from $C_{1-6}$ alkyl, $C_{2-6}$ alkenyl, halogen, hydroxyl and carboxyl, with $R^1$, $R^2$, and $R^5$ being present individually up to 5 times on each aromatic ring to which it(they) is(are) attached, and $R^3$ and $R^4$ being present individually up to 4 times on each aromatic ring to which it(they) is(are) attached, n is 0-3 and m is 0-1.

More specific examples of cationic cure catalysts having core cations within structure I include those represented by structures II and III:

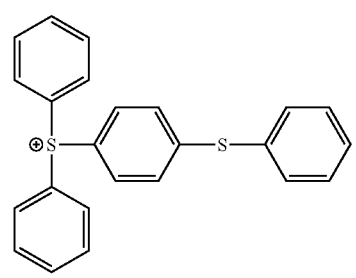

II

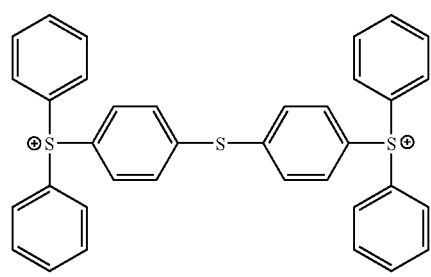

III

In addition, appropriate cationic cure catalysts include those having core cations within structures TV, V, and VI:

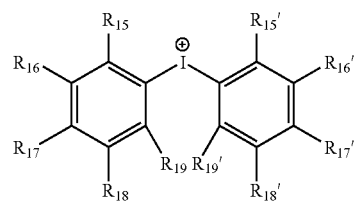

IV

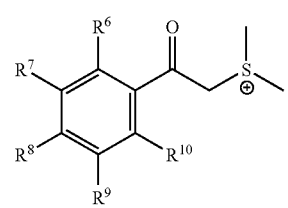

V

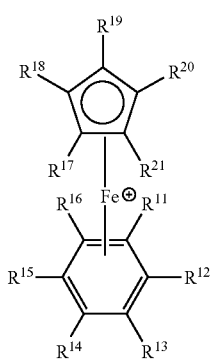

where for structures IV $R^6$, $R^7$, $R^8$, $R^9$ and $R^{10}$ may or may not be present, but when not present are hydrogen and when any are present may individually be selected from alkyl, such as from 1 to 5 carbon atoms, halogen, hydroxyl, and carboxyl, for structure V $R^6$, $R^7$, $R^8$, $R^9$, $R^{10}$, $R^{6'}$, $R^{7'}$, $R^{8'}$, $R^{9'}$, and $R^{10'}$ may or may not be present, but when not present are hydrogen and when any are present may individually be selected from hydrogen alkyl, such as from 1 to 5 carbon atoms, halogen, hydroxyl, and carboxyl, and for structure VI $R^{11}$, $R^{12}$, $R^{13}$, $R^{14}$, $R^{15}$, $R^{16}$, $R^{17}$, $R^{18}$, $R^{19}$, $R^{20}$, and $R^{21}$ may or may not be present, but when not present are hydrogen and when any are present may individually be selected from hydrogen alkyl, such as from 1 to 5 carbon atoms, halogen, hydroxyl, and carboxyl.

More specific examples of cationic cure catalysts having core cations within structure IV, V and VI include those represented by structures VII(a) and VII(b), VIII and IX, respectively:

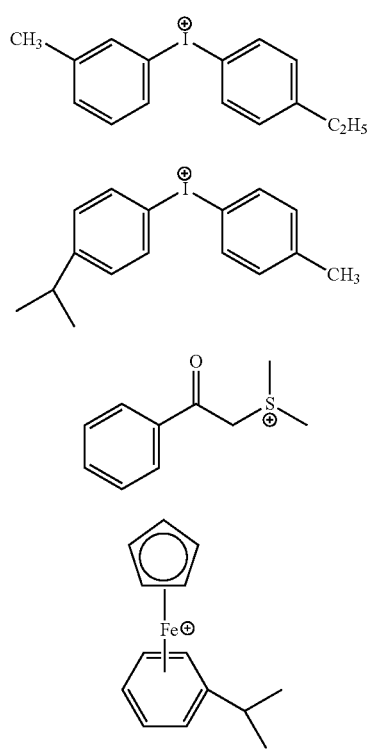

Structure VII(b) is the cationic portion of the cure catalyst called RHODOSIL 2074, commercially available from Rhodia Chemie, whose chemical name is tolylcumyl iodonium tetrakis(pentafluorophenyl)borate (CAS No. 178233-72-2).

Examples of the cationic cure catalysts include those commercially available from Sartomer, Exton, Pa. under the SARCAT tradename, such as SARCAT K185 [triarylsulfonium hexafluorophosphate (50 percent in propylene carbonate)]; SARCAT SR100 [triarylsulfonium hexafluoroantimonate (50 percent in propylene carbonate)]; and SARCAT SR1012 (diaryliodonium hexafluoroantimonate). In addition, those available from Dow under the CYRACURE tradename, such as UVI-6976 (mixed triarylsulfonium hexafluoroantimonate salts); UVI-6992 (mixed triarylsulfonium hexafluorophosphate salts); UVI-6974 and UVI-6990 are also useful.

Another commercially available example of the cationic cure catalyst is NACURE XC-7231 from King Industries, Inc., Norwalk, Conn. This catalyst is a quaternary ammonium salt of hexafluoroantimonate, such as ammonium antimony hexafluoride. Still another commercially available example from King Industries is NACURE XC-A230, which is a quaternary amine neutralized salt of triflic acid.

With these commercial cationic cure catalysts, the anionically bound counter ion, such as hexafluorophosphate, may be exchanged if desired with a counter ion having covalently bound halide ions, rather than the loosely bound halides. For instance, halogenated tetraphenyl borates are desirable counter ions, particularly pentafluorotetraphenyl borate. Conventional ion exchange chemistry may be used to effect the change.

A particularly desirable cationic cure catalyst is NACURE XC-7231.

The composition includes the cationic cure catalyst in an amount of from about 0.5 up to about 10 weight percent of the composition.

Typically, the composition includes the rubber component in an amount of from about 5 to about 75 weight percent, the silica component in an amount of from 5 to 75 weight percent and the cationic cure catalyst in an amount of about 0.2 to about 10 weight percent. The composition includes the cycloaliphatic epoxy and the polyester in a by weight ratio of 1:5 to about 5:1, such as about 2:1 to 4:1, desirably 2.5:1 to 3.5:1.

Conditions suitable and desirable to cure the inventive compositions include exposing the compositions to a temperature of about 100° C. for a period of time of about 30-60 minutes.

The inventive compositions may be formulated as one part compositions or two part compositions, as desired.

The present invention also provides methods for adhesively attaching a first article to a second article. Such methods include (a) applying an inventive composition to at least one of a first article and a second article, (b) bringing together the first article and a second article into intimate contact to form an assembly, and (c) subjecting the assembly to conditions suitable to cure the composition.

In accordance with yet another embodiment of the present invention, there are provided assemblies produced by these methods.

The invention will now be illustrated by way of the following examples.

EXAMPLES

Tables 1a and 1b each show four formulations prepared with the specified components in the amounts listed. The formulations of Table 1a highlight the use of core shell particles in non-cycloaliphatic epoxy matrices (Sample Nos. I and II) as well as a cycloaliphatic epoxy matrix without core shell rubber particles, with and without a polyester (Sample Nos. III and IV, respectively) in a cationic curable system. In Table 1b, the formulations highlight the use of core shell particles in a cycloaliphatic epoxy matrix, with a silica component. The silica component and the rubber component are provided as a dispersion in an epoxy resin, with the first being a cycloaliphatic epoxy matrix at a 40 weight percent level and the second at a 75 weight percent level, irrespective of the type of epoxy chosen as the matrix. The formulations of Table 1a were each cured after dispensing onto a substrate by exposure to a temperature of 150° C., whereas the formulations of Table 1a were each cured after dispensing onto a substrate by exposure to a temperature of 100° C. for a period of time of 30-60 minutes. The observations of certain physical properties of those cured formulations are shown in Tables 2a, 2b, 2c and 2d.

TABLE 1a

| Component | | Sample Nos./Amt (parts) | | | |
|---|---|---|---|---|---|
| Type | Identity | I | II | III | IV |
| Epoxy | CYRACURE 6110 | — | — | 100 | 100 |
| Epoxy Diluent | Neopentyl Glycol Diglycidyl Ether | 20 | 20 | 20 | — |
| Polyester | K-FLEX A307 | — | — | — | 20 |
| Core Shell Rubber | KANEKA MX 120* | 100 | — | — | — |
| | KANEKA MX 135** | — | 100 | — | — |
| Silica Filler | AEROSIL R202 | 12 | 12 | 12 | 12 |
| Catalyst | NACURE XC-7231 | 1 | 1 | 1 | 1 |
| Adhesion Promoter | 3-Glycidoxypropyl Trimethoxy Silane | 1 | 1 | 1 | 1 |

*A 25 weight percent dispersion of core shell rubber in bisphenol A epoxy resin from Kaneka.
**A 25 weight percent dispersion of core shell rubber in bisphenol F epoxy resin from Kaneka.

TABLE 1b

| Component | | Sample Nos./Amt (parts) | | | |
|---|---|---|---|---|---|
| Type | Identity | V | VI | VII | VIII |
| Epoxy | CYRACURE 6110 | 100 | — | 15 | — |
| Polyester Diol | K-FLEX A307 | — | 20 | 20 | 20 |
| Nano Silica | NANOPOX A610 | — | 74.25 | 10 | 10 |
| Core Shell Rubber | KANEKA MX 550* | — | — | 48.35 | 63.35 |
| Silica Filler | AEROSIL R202 | 5 | 5 | 5 | 5 |
| Catalyst | NACURE XC-7231 | 0.75 | 0.75 | 0.75 | 0.75 |
| Adhesion Promoter | 3-Glycidoxypropyl Trimethoxy Silane | 0.9 | 0.9 | 0.9 | 0.9 |

*At the time of use KANEKA MX-550 was reported to be a 25 weight percent dispersion of core shell rubber in cycloaliphatic epoxy. At the time of filing the subject application, KANEKA MX-550 was reported to be a 15 weight percent dispersion of core shell rubber in cycloaliphatic epoxy. Now, Kaneka also makes MX 551, which is reported to be a 25 weight percent dispersion of core shell rubber in cycloaliphatic epoxy.

The observed results of the formulation evaluations are set forth below in Tables 2a, 2b, 2c and 2d. The T-peel evaluation was performed on mild steel ("MS") specimens and the lap shear evaluation was performed on grit blasted mild steel ("GBMS"), polyphenylsulfone ("PPS"), polycarbonate ("PC") and polyether terephthalate ("PET") specimens.

TABLE 2a

Tensile Shear Data (GBMS, N/mm$^2$)

| | | I | II | III | IV |
|---|---|---|---|---|---|
| 60 Mins @ 100° C. | $\chi$ | 0.30 | 0.39 | 20.4 | 23.8 |
| | $\sigma$ | 0.05 | 0.03 | 1.16 | 2.3 |
| 60 Mins @ 150° C. | $\chi$ | 5.15 | 4.78 | 17.65 | 21.25 |
| | $\sigma$ | 0.35 | 0.39 | 0.74 | 2.06 |

TABLE 2b

T-Peel Data (MS, N/mm$^2$)

| | | I | II | III | IV |
|---|---|---|---|---|---|
| 60 Mins @ 100° C. | $\chi$ | Uncured | 0.74 | 0.34* | 0.4* |
| | $\sigma$ | — | 0.04 | — | 0.02 |
| 60 Mins @ 150° C. | $\chi$ | 6.24 | 8.05 | 0.307 | 0.43 |
| | $\sigma$ | 1.11 | 0.75 | 0.05 | 0.03 |

*Polymer extremely brittle

TABLE 2c

Dynamic Mechanical Data

| | I | II | III | IV |
|---|---|---|---|---|
| Tg (° C.) Cured 60 Mins @ 100° C. | Uncured | Uncured | 127 | 166 |
| Tg (° C.) Cured 60 Mins @ 150° C. | 40 | 33 | —* | —* |

*Polymer extremely brittle

TABLE 2d

| Physical Properties Cured for 60 Mins @ 100° C. | V | VI | VII | VIII |
|---|---|---|---|---|
| T-Peel [MS, 250 μm gap (N/mm)] | 0 | <1 | 11.01 | 16.96 |
| Lap Shear - GBMS (N/mm$^2$) | 13.24 | 26.01 | 28.51 | 20.13 |
| PPS | — | — | — | 13.81 |
| PC | — | — | — | 14.33 |
| PET | — | — | — | 5.66 |
| Tg (° C.) | 145.5 | 108 | 68.3 | 56 |
| Modulus @ RT | $5.66 \times 10^8$ | $1.55 \times 10^9$ | $2.12 \times 10^8$ | $1.14 \times 10^8$ |
| Fracture Toughness [G1c (Jm$^{-2}$)] | 0 | 0 | — | 1716 |

The T peel and tensile shear strength evaluations were performed in accordance with the following respective parameters:

| 180° Tensile Peel ASTM D1876 | |
|---|---|
| Specimens: | MS, 1.00 mm substrate thickness |
| Bondline: | 0.25 mm |
| Testing rate: | 200 mm/min |
| Test temperature: | Ambient |
| Tensile Lap Shear ASTM D1002 | |
| Specimens: | GBMS, 1.6 mm substrate thickness |
| Bondline: | 0.05 mm |
| Testing rate: | 200 mm/min |
| Test temperature: | Ambient |

Sample No. V is an unflexibilised/untoughened formulation based on a cycloaliphatic epoxy resin, CYRACURE 6110, and illustrates as a control the properties of such a system.

Sample No. VI is based on NANOPOX A610 which is a commercially available cycloaliphatic epoxy resin (CYRACURE 6110) that contains 40 weight percent silica nanoparticles, which includes 20 parts of the flexibiliser K-FLEX A307.

Sample Nos. VII and VIII contain KANEKA MX 550 and flexibiliser K-FLEX A307 and in the case of Sample No. III, CYRACURE 6110 as well.

Sample No. VIII and Sample No. V were evaluated for fracture toughness measurements using a tapered double cantilever beam. One difference between Sample No. VIII and Sample No. V is the identity of the core shell rubber. While each is a dispersion of the same type of core shell rubber in an epoxy, the epoxy used in the dispersion in Sample No. V is an aromatic one whereas the epoxy used in the dispersion in Sample No. VIII is a cycloaliphatic one. While Sample No. V cures at a low temperature, the observations of the cured Sample No. indicates that insufficient toughness is induced.

Sample No. VIII also demonstrates excellent tensile lap shear strength [GBMS] and tensile peel strength [MS], and good fracture toughness (G1c), as measured by tapered double cantilever beam. ASTM D3433 Standard Test Method For Fracture Strength in Cleavage of Adhesives in Bonded Metal Joints specifies a method, based on the use of linear elastic fracture mechanics, for the determination of the fracture toughness (the critical strain energy release rate or fracture energy) of adhesives bonded in double cantilever beam ("DCB") or tapered double cantilever beam ("TDCB") joints. The values reported by this test method are termed the fracture toughness (G1c) with reference to the substrate geometry, bond gap and test conditions used.

The following conditions were used to determine the fracture toughness reported in Table 2d of the formulations shown in Table 1b:

| Fracture Toughness (G1c, Jm$^{-2}$) by Tapered Double Cantilever Beam | |
|---|---|
| Specimens: | GBMS |
| Bondline: | 0.5 mm |
| Test Rate: | 0.1 mm/min |
| Test Temperature: | 22° C. |

A comparison of the values reported in Tables 2a-2d shows that Sample Nos. I and II have relatively poor physical properties when cured at low temperature (such as 100° C.) for 60 minutes, as contrasted with Sample Nos. VII-VIII. More specifically, the tensile shear, T-peel and glass transition temperature data presented in Tables 2a-2c for Sample Nos. I and II indicate that these formulations do not cure sufficiently under a low temperature curing profile. Sample Nos. I and II require a minimum cure temperature of at least 150° C. in order to attain meaningful physical properties (such as tensile shear strength or T-peel strength) as evidenced by the results in Tables 2a-2c. Reference to those tables show that at a cure temperature of 150° C. for 60 minutes these formulations are just starting to demonstrate some bond strengths. Thus, these formulations if cured under the low temperature fast curing specification are not suitable for applications requiring that cure profile.

Sample Nos. III, IV and V are based on cycloaliphatic epoxy resins but do not contain rubber particles. Sample No. V is very reactive at low temperature and cures to a polymer that is very brittle and does not exhibit meaningful T-peel toughness and the tensile shear strengths (Table 2d) are reduced because of the brittle nature of the cured formulation. Sample Nos. III and IV are flexibilised versions of Sample No. V that demonstrate the utility of adding a flexibiliser as evidenced by the improved tensile shear strength data for Sample Nos. III and TV as contrasted to Sample No. V.

None of Sample Nos. III, IV and V exhibit meaningful toughness as evidenced by the poor T-peel strengths.

Sample No. VI is based on a cycloaliphatic epoxy resin, NANOPOX A610, which contains 40 percent by weight of a nano sized silica. Such resins have been reported to improve toughness of cycloaliphatic epoxy systems. Sample No. VI cures effectively at a temperature of 100° C. as demonstrated by the excellent tensile shear strengths in Table 2d. However, Sample No. VI did not show significant toughness, with T-peel strengths of <1 N/mm.

Sample Nos. VII and VIII contain KANEKA MX 550, a cationically curable cycloaliphatic epoxy resin, a hydroxyl functionalized polyester, a nano-dispersed silica component and a cationic cure catalyst. These samples demonstrate both excellent tensile shear strengths and T-peel strengths when cured at a low temperature of 100° C. for a short period of time of 60 minutes.

In addition Sample No. VIII demonstrates excellent fracture toughness.

What is claimed is:

1. A cationically curable composition comprising:
   a. a cycloaliphatic epoxy;
   b. a hydroxyl-functionalized aliphatic polyester;
   c. a rubber component having a particle size on the order of $10^{-9}$ meters dispersed in a cationically curable epoxy;
   d. a silica component having a particle size on the order of $10^{-9}$ meters dispersed in a cationically curable epoxy; and
   e. a cationic cure catalyst, wherein when cured at a temperature of 100° C. for a period of time of 60 minutes the composition demonstrates tensile peel strength on mild steel substrates spaced apart by 250 nm of greater than about 11 N/mm.

2. The composition of claim 1, wherein the cycloaliphatic epoxy has two or more epoxy groups.

3. The composition of claim 1, which cures when exposed to a temperature of 100° C. for a period of time of 30 to 60 minutes.

4. The composition according to claim 1, wherein the rubber component is a core shell rubber.

5. The composition according to claim 1, wherein the rubber component is surface modified rubber.

6. The composition of claim 1, wherein the cycloaliphatic epoxy and the polyester are present in a by weight ratio of 2.5:1 to 3.5:1.

7. The composition according to claim 1, wherein the cationic cure catalyst includes a cationic counter ion within the following structure:

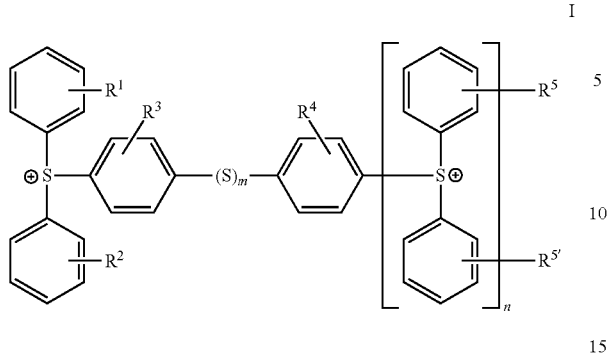

I wherein $R^1$, $R^2$, $R^{3'}$ $R^4$, $R^5$ and $R^{5'}$ are selected from hydrogen, $C_{1-6}$ alkyl, $C_{2-6}$ alkenyl, halogen, hydroxyl and carboxyl, with $R'$, $R^2$, $R^5$ and $R^{5'}$ being present individually up to 5 times on each aromatic ring to which it(they) is(are) attached, and $R^3$ and $R^4$ being present individually up to 4 times on each aromatic ring to which it(they) is(are) attached, n is 0-3 and m is 0-1.

8. The composition according to claim 1, wherein the cationic cure catalyst includes a counter cation selected from the group consisting of

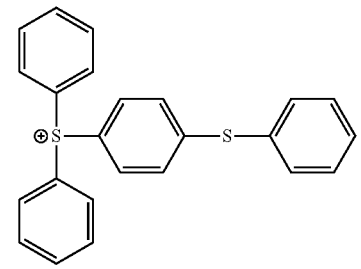

II

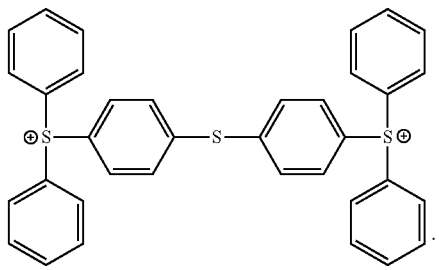

III

9. The composition according to claim 1, wherein the cationic cure catalyst includes a counter cation selected from the group consisting of

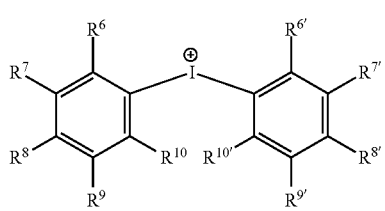

IV

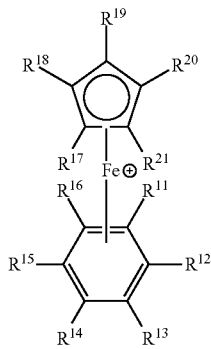

VI

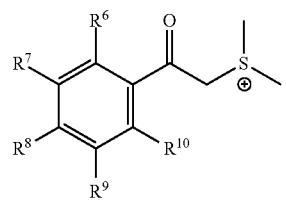

V wherein for structure IV $R^6$, $R^7$, $R^8$, $R^9$ and $R^{10}$ are selected from hydrogen, alkyl of from 1 to 5 carbon atoms, halogen, hydroxyl, and carboxyl, for structure V $R^6$, $R^7$, $R^8$, $R^9$, $R^{10}$, $R^{6'}$, $R^{7'}$, $R^{8'}$, $R^{9'}$, and $R^{10'}$ are selected from hydrogen, alkyl of from 1 to 5 carbon atoms, halogen, hydroxyl, and carboxyl, and for structure VI $R^{11}$, $R^{12}$, $R^{13}$, $R^{14}$, $R^{15}$, $R^{16}$, $R^{17}$, $R^{18}$, $R^{19}$, $R^{20}$, and $R^{21}$ are selected from hydrogen, alkyl of from 1 to 5 carbon atoms, halogen, hydroxyl, and carboxyl.

10. The composition according to claim 1, wherein the cationic cure catalyst includes a counter cation selected from the group consisting of

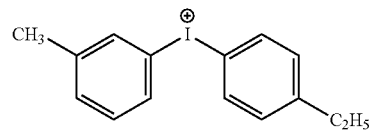

VII(a)

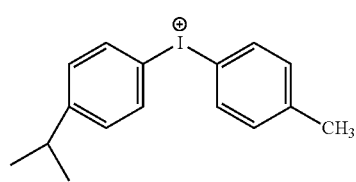

VII(b)

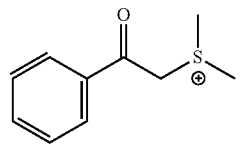

VIII and

IX

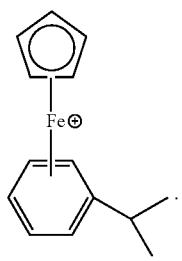

11. The composition according to claim 1, wherein the cationic cure catalyst is used in an amount within the range of about 0.1 to about 2 percent by weight of the total composition.

12. The composition according to claim 1, wherein the cationic cure catalyst is an ammonium antimony hexafluoride.

13. The composition according to claim 1, wherein the cationic cure catalyst includes a cation selected from the group consisting of onium, iodonium and sulfonium.

14. The composition of claim 1, wherein the cationic cure catalyst includes an anion selected from the group consisting of tetrakis(pentafluorophenyl)borate, hexafluorophosphate and hexafluoroantimonate.

* * * * *